United States Patent [19]

Salger

[11] 4,213,617

[45] Jul. 22, 1980

[54] ASSEMBLY FOR SEALING LEAD-IN AREAS IN A DEVELOPER STATION

[75] Inventor: Werner Salger, Hamburg, Fed. Rep. of Germany

[73] Assignee: Lumoprint Zindler KG (GmbH & Co.), Hamburg, Fed. Rep. of Germany

[21] Appl. No.: 27,775

[22] Filed: Apr. 6, 1979

[30] Foreign Application Priority Data

Apr. 17, 1978 [DE] Fed. Rep. of Germany ....... 2816621

[51] Int. Cl.[2] ......................... F16J 15/40; F16J 15/54

[52] U.S. Cl. ......................................... 277/12; 277/80; 277/DIG. 7; 118/654; 118/658; 355/3 DD

[58] Field of Search ...................... 277/80, 12, DIG. 7; 118/658, 653, 654; 355/3 DD

[56] References Cited

U.S. PATENT DOCUMENTS

| | | | |
|---|---|---|---|
| 2,863,538 | 12/1958 | Jaeschke | 277/80 X |
| 3,031,802 | 5/1962 | Leliaert | 277/80 X |
| 3,543,720 | 12/1970 | Drexler et al. | 355/3 DD |
| 3,643,629 | 2/1972 | Kangas et al. | 118/658 |
| 3,791,730 | 2/1974 | Sullivan | 118/654 X |
| 3,834,775 | 9/1974 | Tuffias et al. | 277/80 X |
| 3,848,879 | 11/1974 | Hudgins | 277/80 |
| 3,915,121 | 10/1975 | Wilcox | 118/658 |
| 4,057,258 | 11/1977 | Ernst et al. | 277/80 X |
| 4,101,211 | 7/1978 | Kayson | 118/653 X |
| 4,132,192 | 1/1979 | Weyers et al. | 118/658 |

FOREIGN PATENT DOCUMENTS

| | | | |
|---|---|---|---|
| 267656 | 11/1963 | Australia | 277/80 |
| 2247953 | 4/1974 | Fed. Rep. of Germany | 277/80 |
| 680233 | 10/1952 | United Kingdom | 277/80 |
| 1507837 | 4/1978 | United Kingdom | 277/DIG. 7 |

OTHER PUBLICATIONS

*Machine Design*, issue of Mar. 28, 1968, pp. 145-150.

*Primary Examiner*—Robert S. Ward, Jr.

*Attorney, Agent, or Firm*—Toren, McGeady and Stanger

[57] ABSTRACT

A sealing assembly for a developed station in a copying machine for sealing apertures in a casing wall of the developer station to prevent developer powder, including magnetizable particles, from escaping into the housing of the copying machine establishes an effective permanent non-friction and wear-free seal at casing wall apertures such as casing openings through which rotating shafts or other movable members extend. The seal consists of magnetic members in the vicinity of an aperture for establishing a magnetic field barrier across the aperture. The magnetic members consist of permanent magnets or of solenoids in the configuration of strips, discs, triangles, rings or wedges. Optionally a cover member straddling the aperture, may cooperate with the magnetic barrier members.

10 Claims, 12 Drawing Figures

ASSEMBLY FOR SEALING LEAD-IN AREAS IN A DEVELOPER STATION

BACKGROUND OF THE INVENTION

The present invention relates generally to copying machines or apparatus and particularly to a developer station of a copying machine and more particularly to a sealing assembly for sealing lead-in areas in a developer station of a copying machine in which a latent image is developed that has been established in a conductive material by an at least partly magnetizable mixture of developer powder transported towards the conductive material by means of a driven and rotating magnet drum and fed to the magnet drum from a supply. In side walls of a casing of the developer station shaft lead-in areas and bearings also for shafts are provided including feeding or mixing elements for the mixture of developer powder.

Copying machines of the above stated type and developer stations for such copying machines are already known. A developer station with a magnet drum in described in the German Laying-Open specifications Nos. 2,224,624 and 1,963,751. With magnet drums of the type described in the cited specifications there arises the problem that the mixture of developer powder that forms a brush at the field lines of the magnet drum and fed to the magnet drum from a supply, may escape at both sides of the magnet drum into the housing of the copying machine. Thereby the copying machine is contaminated. It has already been tried to have the ends of the magnet drum rotate in a sleeve made of a sealing material. A seal of this type, however, causes friction and is subject to wear so that a long term secure seal is not possible, quite apart from the drag resistance against rotation of the magnet drum.

With respect to the magnet drum, the invention relates to all prior art types of magnet drums, i.e. magnet drums with a rotating magnet system as well as magnet drums with a stationary magnet system wherein the magnet drum is surrounded by an encasing tube. In the latter case, the encasing tube is driven in a manner known per se.

The magnets of the magnet system extend, in these magnet drums, generally in the axial direction whereby the polarization alternates about the circumference of the magnet system, that is, of the magnet drum. Particularly in a magnet drum with an encasing tube it is known that the magnet system is somewhat shorter in axial direction than the encasing tube so that in the regions of the ends of the encasing tube there will not be formed a magnet brush or only a weak magnet brush, and exactly in these regions the risk of mixture of developer powder being thrown off or escaping into the housing of the copying machine is particularly great.

The mixture of developer powder consists of extremely fine particles of a pigment which performs the development proper, and fine iron particles serving as carrier for the pigment.

The magnet system of the magnet drum may be of a design that is different from the design indicated above. The arrangement with axially extending pole strips is especially advantageous and is preferred.

In developer devices of the stated type there is arranged a trough shaped supply reservoir for the mixture of developer powder underneath the magnet drum and optionally laterally offset thereto. Intermediate this supply reservoir and the magnet drum may be disposed feeding means of various designs, such as in the form of a cup or pump unit which drops the mixture of developer powder from above onto the magnet drum. Alternatively the feeding means can be in the form of a feeder magnet drum or in the form of proposed throw-feeder devices. It is known to arrange, within the supply reservoir, a screw with feeding elements which, during rotation of the screw, stir the mixture of developer powder on the one hand, and transport this mixture toward feeding means on the other hand. This screw is journalled by means of shaft lead-in portions in the side walls of the supply reservoir. Also with these shaft lead-in portions, which are generally below the level of the supply of developer powder, there exists the problem of a proper and wear-free seal.

SUMMARY OF THE INVENTION

It is, therefore, the object of the present invention to provide a sealing assembly of the type stated in the first paragraph of the present specification, particularly for sealing a magnet drum or a shaft lead-in portion against the passage therethrough of the mixture of developer powder. The assembly is effective virtually without wear and prevents the escape of the mixture of developer powder particularly during rotation of the magnet drum at the ends of the drum, or at the shaft when rotating this shaft from a supply space.

This object is achieved, in accordance with the present invention, by the fact that in the areas of the ends of the magnet drum in combination with outer magnet assemblies as well as at shaft lead-in portions for shafts with feeding or mixing elements in combination with magnet assemblies, the sealing assembly is provided at least partly within the material of the mixture of developer powder.

The magnet assemblies are provided with magnetic fields in which the mixture of developer powder itself defines a magnet brush and provides a reliable sealing effect whereby with respect to the defined gaps a moving edge element is included. In this manner, it is possible, by a particular arrangement of the magnetic field in the region of the gap, to achieve a movement of the magnetizable material away from the gap.

Particularly for sealing a magnet drum, a preferred embodiment of the present invention provides that outer magnet assemblies are provided in the region of the ends of the magnet drum. The corresponding sealing fields are generated by these outer magnet assemblies. It is not excluded that for this purpose annular outer magnet assemblies may be provided which surround the ends of the magnet drum. The particularly preferred and advantageous embodiment resides in the fact that, with an arrangement of the magnet drum between axially extending wall members, there are arranged magnet pieces at these wall members in the regions at the ends of the magnet drum and these magnet pieces include an inclined edge that extends in an oblique direction toward the center of the magnet drum, the inclined edge being located at the outside with respect to the direction of rotation of the magnet drum (toward the ends of the magnet drum). By this inclined edge a magnet field will be generated at which, when mixture of developer powder is supplied at the ends of the magnet drum, the escape of the powder at this location will be prevented and the mixture of developer powder will be automatically advanced or entrained toward the center of the magnet drum so that not only will a sealing effect be achieved but simultaneously the mixture of developer powder will be conveyed towards a functional location in the region of the generated brush at the magnet drum.

Advantageously, the magnets or magnet pieces are permanent magnets. In this manner a simple design is achieved without requiring significant space. Solenoids may likewise be employed.

Particularly when the magnet drum includes a stationary magnet system and a rotating encasing tube, the magnet pieces may advantageously be of such polarizations as to define a closed field with the opposite part of the magnet system. Particularly when the magnet system is somewhat shorter than the encasing tube, the inclined edge of the magnet pieces may extend beyond the region in which the encasing tube is devoid of the magnet system. Thereby, it is preferred that the edge extends over the magnet system.

In the preferred embodiment the magnet pieces are substantially of a triangular configuration. Strip-shaped magnet pieces are also included which are arranged obliquely with respect to the axis of the magnet drum. For sealing a shaft lead-in portion, in accordance with the present invention the lead-in portion is surrounded by a magnet ring on the side at which the supply of mixture of developer powder or of the particulate magnetizable material is located. This magnet ring may be designed in various ways, either as a ring magnet with a peripheral uniform polarization, or in an embodiment with alternate polarizations whereby an arrangement is provided such that the field lines always define bushels for brush generation in the direction toward the gap of the shaft lead-in portion.

Thereby an embodiment is particularly preferred in which a substantially frusto-conical cover member, which is wider toward the shaft lead-in portion, is arranged on the shaft and is secured for rotation jointly with the shaft. The outer edge of this cover member terminates within the magnet ring in the region of an establishing brush generated by the lines of the magnetic field. The term "frusto-conical" is intended to designate an advantageous embodiment because the inner cavity in the lower region forms a chute-like inclined wall portion that extends toward a lower passage gap at the magnet ring so that particulate magnetizable material which has entered the space between a lateral wall or respectively plate of the shaft lead-in portion and the cover member will drop by gravity onto the lower passage gap and may therefore return into the supply reservoir, due to the resiliency of the brush-like seal by means of the field lines and at a sufficient proper weight. In an advantageous embodiment the outer edge of the cover member is provided with particularly vane-shaped profilings adapted to enhance the removal of magnetizable material.

The cover member may likewise be of a substantially bell shaped configuration, with an outwardly extending edge which bears at its ends the profilings in the form of inclined notches.

A shaft lead-in portion of this type is sealed advantageously in the developer device in the indicated manner. The lead-in portion is provided for the shaft of a feeding screw which rotates within the supply of the mixture of developer powder. A suitable characteristic in this context is that a feeding screw is arranged on the shaft and has feeding elements which are at a pitch so that magnetizable material, particularly a mixture of developer powder, will be transported away from the lead-in area. This also brings about a relief particularly in the lower region adjacent the cover member so that the mixture of developer powder which may have penetrated between side wall and cover member, may easily return into the supply. The concave side of the cover member faces the side wall and encloses a space of a sufficient size to prevent the accumulating material or mixture of developer powder from reaching the level of the shaft lead-in area.

In the following, the present invention will be described more in detail with reference to the embodiments shown in the drawings

DETAILED DESCRIPTION OF THE INVENTION

Figure 1:
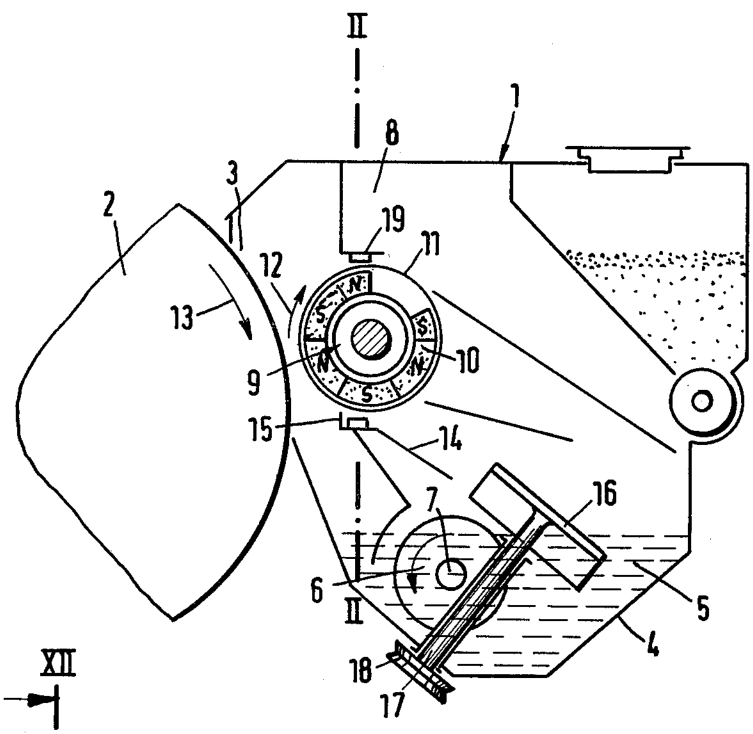
FIG. 1 is a schematical lateral elevational sectional view of a developer station with a sealing assembly in accordance with the present invention.

Referring to FIG. 1, there is shown a developer station 1 for a copying machine. The developer station is adjacent a cylinder 2 having a chargeable surface. This cylinder is known in copying machines as the carrier of a latent image that is established by an exposure. The cylinder may, for example, include a selenium coating.

The developer station 1 has at its ends on both sides side walls or side plates which extend along planes that are parallel to the plane of the drawing. The shafts of rotating parts extend through these side walls or side plates. These side walls extend into close proximity of the cylinder 2 and particularly in the region of an opening 3 of the casing of the developer station. The opening is adjacent the face walls of the cylinder. The developer station casing forms, in its bottom portion, a trough 4 in which a supply 5 of the mixture of developer powder is located. Within this supply a feeding or mixing screw 6 rotates with its shaft 7 extending through the side walls. A magnet drum indicated generally by the reference numeral 9 is arranged adjacent the opening 3 and within the casing 8 of the developer station. The magnet drum 9 includes a stationary magnet system 10 formed of axially extending alternately polarized magnet strips and an encasing tube 11 which may be driven in the direction of the arrow 12. With this sense of rotation, the cylinder 2 is driven in the direction of the arrow 13.

A baffle sheet 14 is arranged underneath the magnet drum 9 and is inclined upwardly toward the magnet drum. This baffle sheet 14 terminates at its upper end in a stripper bar 15 which extends toward the magnet drum 9. The mixture of developer powder is thrown against the magnet drum or against the baffle sheet by means of a feed-throw device 16 so that a "brush" of developer powder will be generated in the area of the field lines of the magnet system 10. This developer powder brush is smoothed by the stripper bar and is entrained by the encasing tube 11. The feed-throw device 16 consists, for example, of an impeller with a top cover member. This impeller is journalled by means of a shaft 17 and is driven. The outwardly extending end of the shaft 17 bears a drive element 18. The feeding or mixing screw 6 is of a design so that when this screw rotates it not only mixes the supply 5 but transports developer powder into the region of the feed-throw device 16.

Located above the magnet drum 9, is a limiting angle member 19 that extends along the length of the magnet drum. The limiting angle member 19 closes the space with the supply 5 against the opening 3. The limiting angle member is at a sufficient spacing from the magnet drum so that unconsumed mixture of developer powder or carrier particles may be returned to the supply 5.

In the remaining figures the same parts are identified by the same reference numerals.

Figure 2:
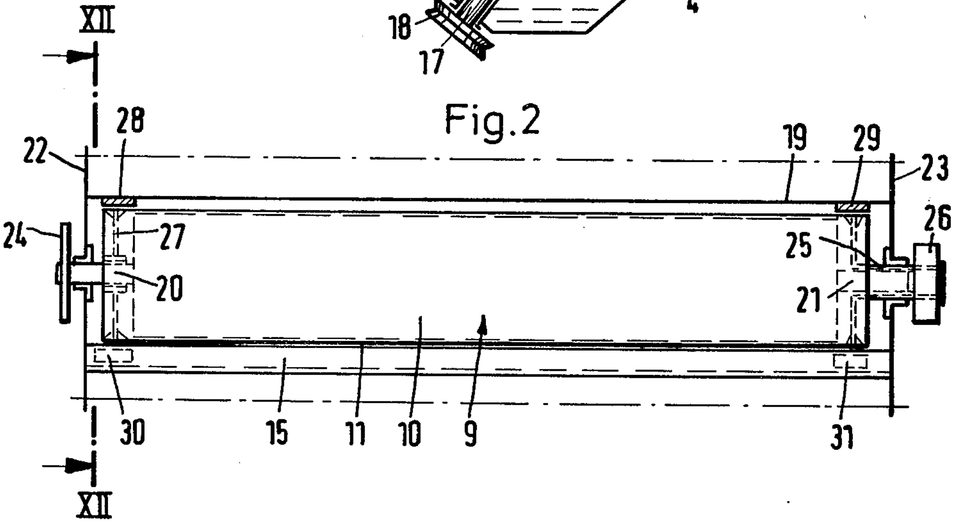
FIG. 2 is a fragmentary section view along the line II—II of FIG. 1.
Figure 5:
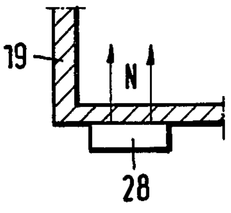
FIG. 5 is a fragmentary view of FIG. 3 in an enlarged scale.

As apparent from FIG. 2, the magnet drum 9 is journalled by means of axles 20, 21 in the side walls 22, 23 in which the members 14, 15 and 19 are also mounted. The magnet system 10 is supported on these axles. At the outwardly projecting axle 20 an adjusting means 24 may be arranged. The other axle 21 is surrouned by a hollow shaft 25 which is provided with a drive unit 26 and supports, on this side wall 28, the encasing tube 11. On the other side wall 22, the encasing tube 11 is journalled on the axle 20 by means of a star 27.

FIG. 2 illustrates that the magnet system is shorter than the encasing tube. Particularly in the region of the ends of the encasing tube which region is devoid of the magnet system or generally at the ends of the drum 9, the mixture of developer powder may pass along the cylinder 2 and enter the copying machine.

Figure 7:
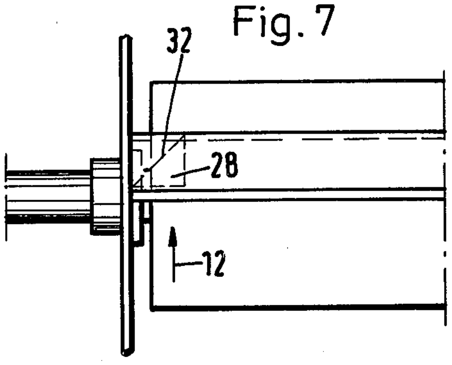
FIG. 7 is a top view of FIG. 4.
Figure 9:
FIG. 9 illustrates different shapes of magnet pieces.
Figure 6:
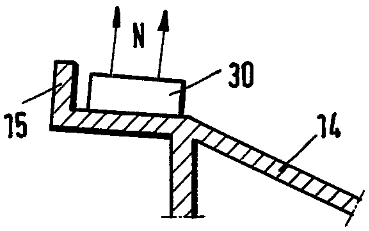
FIG. 6 is a fragmentary view of FIG. 3 in an enlarged scale.
Figure 8:
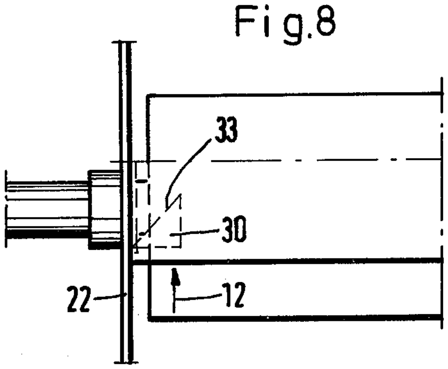
FIG. 8 is a fragmentary bottom view of FIG. 4.

As shown particularly in FIGS. 3 to 7, magnet pieces 28, 29, 30, 31 are arranged in the region of the ends of the magnet drum at the lower surface of the limiting angle member 19 and on the stripper bar 15 of the baffle sheet 14. In their advantageous embodiments, these magnet pieces are of a triangular configuration as shown in FIGS. 7 and 8. Therefore, it is important that when the encasing tube moves in the direction of the arrow 12, an edge 32, 33 which is obliquely arranged with respect to the axis of the magnet drum 9, extends toward the center of the magnet drum. The magnet pieces may also be of a different configuration, however, always under the prerequisite that there is formed an edge 32, 33. As shown in FIG. 9, this configuration may be an elongate strip 36 arranged at an inclination, or a semi-circular discs 37 or the like. For clarifying the position of the edge 32, 33, it is pointed out that the edges respectively meet like arrows at both ends of the magnet drum when the edges are (theoretically) extended in the direction of the passage of the encasing tube.

Figure 4:
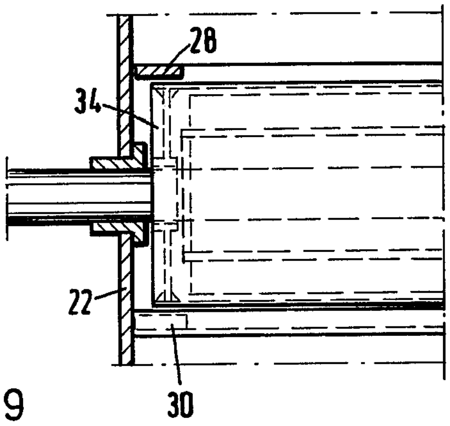
FIG. 4 is a lateral fragmentary view of FIG. 3.

FIG. 4 shows that the edge 32, 33 is of a length, so that the magnet pieces on the whole have a width for advantageously bridging the section 34 which is devoid of magnets at the ends of the magnet drum.

Figure 3:
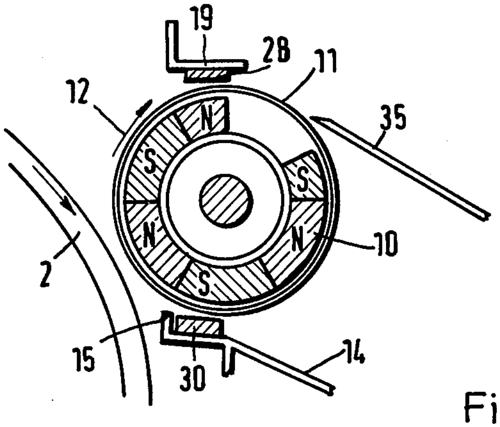
FIG. 3 is a fragmentary view of FIG. 1 in an enlarged scale.

In the polarization of the magnet system 10 as shown in FIG. 3 a North pole strip underlies the magnet piece 28, and a South pole strip overlies the magnet piece 30. The respective adjacent magnet piece 28, 30 is of such a polarization that there may be formed closed lines of field, i.e. the top magnetic piece 28 has a downwardly directed South pole, and the bottom magnetic piece 30 has an upwardly directed North pole, as may be seen particularly in FIGS. 5 and 6, respectively.

When the mixture of developer powder enters the magnetic field established in the described manner, there will be formed brush-type accumulations along the field lines which during rotation of the encasing tube migrate along the edges 32, 33 inwardly, i.e. toward the center of the magnet drum, and thus are brought into the region of the brush or into the region of a doctor blade 35.

Figure 12:
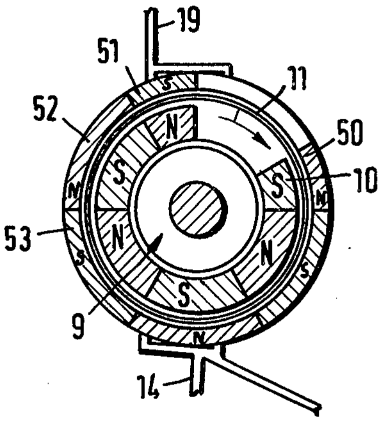
FIG. 12 is a face view of FIG. 2 along the line XII—XII, for explaining another modified embodiment.

FIG. 12 illustrates that instead of magnet pieces 28, 30 as in FIG. 2, the magnet drum 9 may be surrounded at each end by a magnet ring 50 which is supported on wall parts such as at the limiting angle member 19 and at the baffle plate 14.

When the magnet system 10 of the magnet drum 9 is polarized in the pattern shown in FIGS. 1 and 3, then the magnet ring 50 suitably consists of corresponding sections 51, 52, 53, . . . but which have opposite polarities. Likewise a magnet ring having a continuous polarization may be included, with poles at the inner and outer surfaces or poles at the side surfaces.

Figure 10:
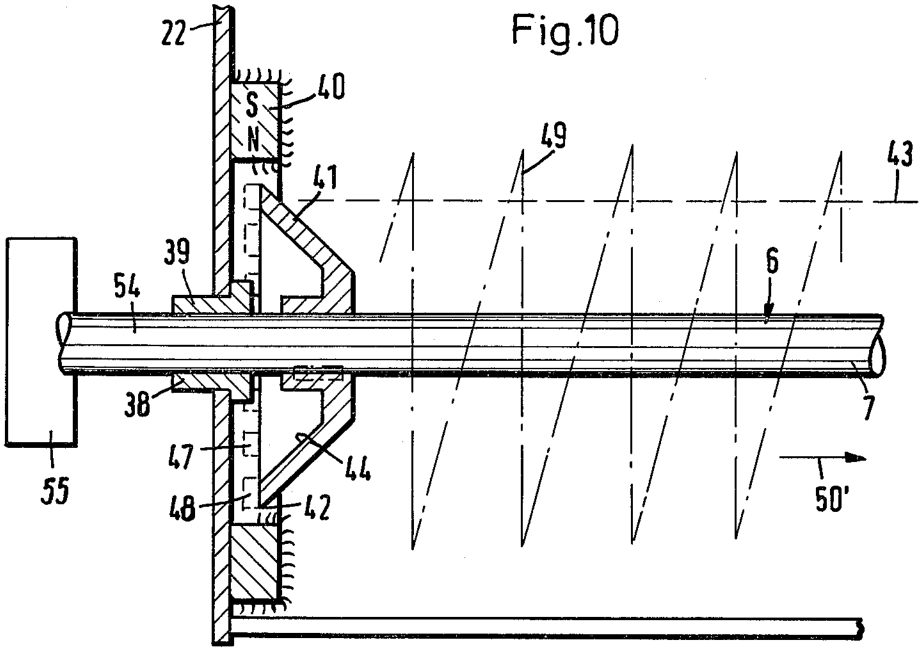
FIG. 10 is a fragmentary view of a shaft lead-in area in an apparatus according to FIG. 1.

FIG. 10 illustrates in a fragmentary showing the feeding or mixing screw which had been identified in FIG. 1 by reference numeral 6. The shaft 7 extends for example through the side wall 22 by means of the shaft lead-in area 38. In this shaft lead-in area a bearing bush 39 is suitably disposed. This shaft lead-in area is surrounded by a magnet ring 40. This magnet ring is polarized so that the South pole is on the outside and the North pole is on the inside. This magnet may be a permanent magnet. A combination of magnet ring with magnet sections of alternating polarities is also included.

A cover member 41 of a frusto-conical configuration is arranged on the shaft 9 and is disposed in front of the lead-in area so that the concave side of the cover member faces the lead-in area. The cover member is secured to the shaft and rotates together with the shaft. The spacing of the cover member from the side wall is selected with respect to the configuration so that the peripheral edge 42 of the cover member is disposed in the region of the magnetic field of the magnet ring by which accumulations of developer powder in the region of the field lines. These accumulations define seals. When the supply 5 of developer powder extends up to the level 43, then mixture of developer powder at the outer side of the cover member 41 may also reach the upper part of the magnet ring 40.

The field lines at the magnet ring and especially the field lines in the direction toward the cover prevent that mixture of developer powder, in an appreciable quantity, penetrates between the cover member 41 and the side wall 22. If, nevertheless, the mixture of developer powder enters into this space, the powder will drop downwardly between the cover member 41 and the side wall 22 where the inclined wall portion 44 which is similar to a funnel and defines in its lower region an accumulation at the gap between the magnet ring and the cover member. If this accumulation attains a certain size, the accumulated mixture of developer powder will be gradually urged toward the center and into the supply 5 because the cover member is yieldable by means of the field lines of the magnet ring 40.

The spacing between the edge 42 and the magnet ring is small and may be in the order of magnitude of 2 to 3 mm.

Figure 11:
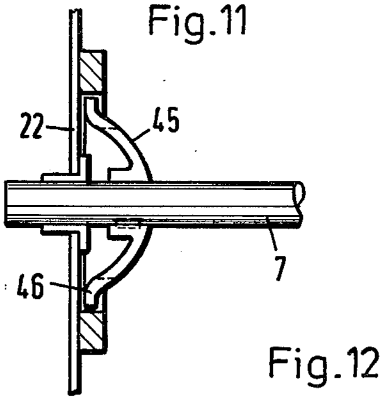
FIG. 11 is a fragmentary view of FIG. 10, for explaining a modified embodiment.

As shown in FIG. 11 in which the cover member 45 has a bell-shaped configuration at the edge 46, profilings are provided in the form of inclined notches extending obliquely with respect to the edge and in such a direction that an accumulation between side wall 22 and cover member 41 or cover member 45 will be transported back toward the center and into the supply 5 when the feeding and mixing screw 6 rotates. Correspondingly, there may likewise be arranged, at the edge 42, vane-shaped extensions 47, 48, note FIG. 10, which extend obliquely with respect to the contour of the edge so that a removal of powder toward the outside is effected.

The feeding or mixing tool 49 is suitably provided so that the supply 5 is transported in the direction of the arrow 50' toward the center, suitably toward the feed-throw device 16 for providing pressure relief at the convex side of the cover member 41 or 45.

The magnetic lines of field are closed at the magnet ring 40. The cover member 41 may be made of brass.

At the externally projecting end 54 of the shaft 7, a drive unit 55 may be arranged as as shown in FIG. 10. This drive unit may be a gear wheel or directly a gear motor unit.

What is claimed is:

1. A sealing assembly for sealing lead-in areas into a developer station of a copying machine in which a latent image that has been established in a conductive material by an at least partly magnetizable mixture of a developed powder is developed whereby the developer station comprises: a developer housing enclosing the developer station and including a pair of laterally spaced side walls (22,23), a magnet drum (9) extending between and journalled in side walls (22,23); drive means (26) for the magnet drum; a magnet system (10) provided in and extending in the axial direction of said magnet drum; a supply space (5) within said developer housing and spaced from said magnet drum for holding a mixture of developer powder; means (16) located within said supply space for feeding the mixture of developer powder from the supply space to along the length of the magnet drum; wherein the improvement comprising that support means (15, 19) are located within said developer housing exteriorly of and at the opposite ends of said magnet drum, outer magnet assemblies (28–31, 36, 37 50) mounted on said support means and positioned adjacent to the opposite ends of said magnet drum, said outer magnet assemblies comprising magnet pieces (28–31, 36, 37) located on opposite sides of said magnet drum and each magnet piece including an inclined edge (32, 33) extending obliquely relative to the axis of the magnet drum, the edge being located at the outside with respect to the direction of rotation of the magnet drum (9),.

2. A sealing assembly as defined in claim 1 wherein the magnet drum includes a stationary magnet system and a rotating encasing tube connected to said drive means and said magnet pieces (28–31) are of a polarization by which said magnet pieces define a closed field with the opposite part of the magnet system (10).

3. A sealing assembly as defined in claim 2 wherein the axial dimension of said stationary magnet system is less than the axial dimension of said encasing tube with the opposite ends of said encasing tube being free of said magnet system, and the inclined obliquely extending edges (32, 33) of the magnet pieces extend inwardly into said encasing tube beyond the end regions (34) in which said encasing tube (11) is free of the magnet system (10) into the region containing said magnet system.

4. A sealing assembly as defined in claim 1 wherein said magnet pieces (28–31) are of a substantially triangular configuration.

5. A sealing assembly as defined in claim 1 wherein said magnet pieces (36) are strip-shaped and are arranged obliquely with respect to the axis of the magnet drum (9).

6. A sealing assembly as defined in claim 1 wherein said magnet pieces (37) are of a semi-circular disc design.

7. A sealing assembly as defined in claim 1 wherein said magnet pieces are provided permanent magnets.

8. A sealing assembly as defined in claim 1 wherein said means for feeding the mixtures of developer powder includes a feeding shaft (7) extending through said side walls, feeding and mixing elements on said feeding shaft for extending at least partially into the mixture of developer powder in said supply space, means for supporting said feeding shaft within said side walls, drive means located exteriorly of said side walls for driving said feeding shaft, magnet assemblies for said feeding means comprising magnet rings (40) located at the inner surfaces of the side walls of the developer station and encircling the opposite ends of said feeding and mixing elements on said feeding shaft and to define a field for sealing said feeding shaft lead-in areas through said side walls, a substantially frusto-conical cover member (41, 45) arranged within said magnet ring (40) and secured to said shaft (7) and the outer edge (42, 46) of the larger diameter end of said cover member terminates in a brush established by the field lines of the magnet assembly whereby the substantially frusto-conical cover member is enlarged toward the shaft lead-in area.

9. A sealing assembly as defined in claim 8 wherein said outer edge (42, 46) of said cover member (41, 45) includes profilings (47, 48) of a vane-shaped configuration for allowing the removal of magnetizable material.

10. A sealing assembly as defined in claim 1 wherein said outer magnet assemblies located at the ends of said magnet drum (9) comprises magnet rings (50) laterally encircling the ends of said magnet drum.

* * * * *